(12) United States Patent
Tomiyama et al.

(10) Patent No.: US 10,228,469 B2
(45) Date of Patent: Mar. 12, 2019

(54) RECEPTION DEVICE

(71) Applicant: SONY CORPORATION, Tokyo (JP)

(72) Inventors: Hitoshi Tomiyama, Kanagawa (JP);
Suguru Houchi, Kanagawa (JP);
Katsuyuki Tanaka, Kanagawa (JP);
Hideki Yokoshima, Kanagawa (JP);
Yuya Kondo, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 216 days.

(21) Appl. No.: 15/119,169

(22) PCT Filed: Feb. 13, 2015

(86) PCT No.: PCT/JP2015/053924
§ 371 (c)(1),
(2) Date: Aug. 16, 2016

(87) PCT Pub. No.: WO2015/125700
PCT Pub. Date: Aug. 27, 2015

(65) Prior Publication Data
US 2017/0010362 A1   Jan. 12, 2017

(30) Foreign Application Priority Data

Feb. 24, 2014  (JP) .................................. 2014-032810

(51) Int. Cl.
*G01S 19/34* (2010.01)
*G01S 19/33* (2010.01)
(Continued)

(52) U.S. Cl.
CPC .............. *G01S 19/34* (2013.01); *G01S 19/33* (2013.01); *G01S 19/37* (2013.01); *G01S 19/421* (2013.01)

(58) Field of Classification Search
CPC .......... G01S 19/34; G01S 19/33; G01S 19/37; G01S 19/36; G01S 19/421; G01S 19/243; G01S 19/25
(Continued)

(56) References Cited

U.S. PATENT DOCUMENTS

| 6,441,780 B1 * | 8/2002 | Rog | ........................ G01S 19/22 |
| | | | 342/357.61 |
| 2004/0087270 A1 * | 5/2004 | Krasner | ................ G01S 19/243 |
| | | | 455/12.1 |

(Continued)

FOREIGN PATENT DOCUMENTS

| JP | 07-128423 A | 5/1995 |
| JP | 10-135708 A | 5/1998 |

(Continued)

*Primary Examiner* — Harry K Liu
(74) *Attorney, Agent, or Firm* — Chip Law Group

(57) ABSTRACT

The present technology relates to a reception device that can realize low power consumption. The reception device comprises an RF unit, a demodulating unit, and a control unit. The RF unit includes a filtering unit, an amplifying unit, and an A/D converter. The filtering unit allows an IF signal to pass within a predetermined band. The IF signal is acquired by mixing a reception signal received from a positioning satellite with a local oscillation signal generated by a local oscillation unit to perform frequency conversion of the reception signal into an intermediate frequency. The amplifying unit amplifies the IF signal with a predetermined amplification factor. The A/D converter converts the IF signal from an analog signal into a digital signal. The demodulating unit demodulates the digital signal. Based on the demodulation, the control unit controls an operation of the RF unit. The present technology is applicable to a GNSS receiver.

10 Claims, 14 Drawing Sheets

(51) Int. Cl.
*G01S 19/42* (2010.01)
*G01S 19/37* (2010.01)

(58) Field of Classification Search
USPC .................................................... 342/357.73
See application file for complete search history.

(56) References Cited

U.S. PATENT DOCUMENTS

| | | | | |
|---|---|---|---|---|
| 2005/0059377 | A1* | 3/2005 | Schucker | H04B 1/28 455/334 |
| 2008/0238766 | A1* | 10/2008 | Morgan | G01S 19/35 342/357.75 |
| 2010/0009648 | A1* | 1/2010 | Collier | G01S 19/33 455/313 |
| 2015/0198718 | A1* | 7/2015 | Khalili | G01S 19/21 370/311 |

FOREIGN PATENT DOCUMENTS

| | | |
|---|---|---|
| JP | 2000-261346 A | 9/2000 |
| JP | 2005-207888 A | 8/2005 |
| JP | 2006-084283 A | 3/2006 |
| JP | 2010-166252 A | 7/2010 |
| JP | 2010-178338 A | 8/2010 |
| JP | 2013-257255 A | 12/2013 |
| WO | 2008/107982 A | 9/2008 |

* cited by examiner

RECEPTION DEVICE

CROSS REFERENCE TO RELATED APPLICATIONS

This application is a U.S. National Phase of International Patent Application No. PCT/JP2015/053924 filed on Feb. 13, 2015, which claims priority benefit of Japanese Patent Application No. 2014-032810 filed in the Japan Patent Office on Feb. 24, 2014. Each of the above-referenced applications is hereby incorporated herein by reference in its entirety.

TECHNICAL FIELD

The present technology relates to a reception device, and particularly relates to a reception device that can realize low power consumption.

BACKGROUND ART

Recently, with technical evolution of a mobile phone and a smart phone, services and applications using position information of a user have been provided one after another. Accordingly, there is an increasing need for a GNSS receiver that can acquire accurate position information and that operates with low power consumption. Here, the GNSS receiver is a receiver that has functions of receiving a wireless signal (positioning signal) using 1.5 GHz band transmitted from a low earth orbit satellite (positioning satellite), and calculating a position of the receiver and time.

Although a global positioning system (GPS) of which the United States takes the lead is well known, services such as a global navigation satellite system (GLONASS) developed in Russia, a BeiDou developed in China, and a Galileo mainly developed in the European Union (EU) are also being started. Accordingly, the realization of the GNSS receiver capable of demodulating positioning signals from a plurality of these positioning satellites is expected (for example, see Patent Document 1).

FIG. 1 shows an exemplary structure of a conventional GNSS receiver. As shown in FIG. 1, in the conventional receiver, an intermediate frequency (IF) signal has been acquired by frequency conversion of a reception signal into intermediate frequency using a different mixer for each of the positioning satellites such as a GPS satellite and a GLONASS satellite. Thereafter, the acquired IF signal has been supplied to an analog/digital (A/D) converter using a path different in each IF signal and then, transmitted to a demodulating unit in the next stage.

Specifically, in a GPS processing unit, the reception signal from the GPS satellite is input to a mixer (MIX1) via a low noise amplifier (LNA), mixed with a local oscillation signal FLO1 from a PLL circuit, and converted into the IF signal of about 4 MHz. Thereafter, the IF signal is transmitted to the A/D converter via a low pass filter (LPF) and an amplifier (AGCAMP).

On the other hand, in a GLONASS processing unit, the reception signal from the GLONASS satellite is input to a mixer (MIX1) via a low noise amplifier (LNA). Then, after the reception signal is mixed with the local oscillation signal FLO1 from the PLL circuit, and the frequency conversion is performed therein, the reception signal is input to a mixer (MIX2) via a low pass filter (LPF) and an amplifier (AGCAMP). After the mixer (MIX2) mixes the reception signal with a local oscillation signal FLO2 from the PLL circuit and performs the frequency conversion, the reception signal is transmitted to the A/D converter via a low pass filter (LPF).

In the phase locked loop (PLL) circuit, the local oscillation signal FLO1 generated from one oscillator (LO1) is input to the mixer (MIX1), the local oscillation signal FLO2 divided by a divider is input to the mixer (MIX2) and furthermore, a clock signal for A/D conversion divided by the divider is input to the A/D converter.

In summary, in the conventional GNSS receiver, a reception process for the reception signal has been performed by providing a different circuit (for example, the GPS processing unit and the GLONASS processing unit) for each of satellite positioning systems such as the GPS and the GLONASS. As a result, as shown in A in FIG. 2, a reception frequency band is adjusted by the GPS processing unit so as to be capable of receiving a signal band of the reception signal from the GPS satellite. In addition, as shown in B in FIG. 2 and C in FIG. 2, a reception frequency band is adjusted by the GLONASS processing unit so as to be capable of receiving a signal band of the reception signal from the GLONASS satellite.

CITATION LIST

Patent Document

Patent Document 1: Japanese Patent Application Laid-Open No. 2013-257255

SUMMARY OF THE INVENTION

Problems to be Solved by the Invention

In the GNSS receiver in FIG. 1, however, it has been necessary to provide separate circuits for the GPS and the GLONASS. As a result, circuit sizes have increased and accordingly, the power consumption has increased. Moreover, as in the GNSS receiver in FIG. 1, in the case of forming the path of the IF signal for each of the positioning satellites, a path for the IF signal has to be additionally formed when a service with a different frequency such as the BeiDou is added. This also causes the power consumption to increase.

Therefore, there has been a demand to suppress the power consumption in the GNSS receiver capable of receiving positioning signals transmitted from a plurality of positioning satellites.

The present technology has been made in view of these circumstances, and aims to realize low power consumption in a GNSS receiver capable of receiving positioning signals transmitted from a plurality of positioning satellites.

Solutions to Problems

A reception device according to one aspect of the present technology is a reception device provided with a radio frequency (RF) unit, a demodulating unit, and a control unit. The RF unit includes a filtering unit, an amplifying unit, and an A/D converter. The filtering unit allows an intermediate frequency (IF) signal to pass within a predetermined band. The IF signal is acquired by mixing a reception signal received from a positioning satellite with a local oscillation signal generated by a local oscillation unit to perform frequency conversion of the reception signal into an intermediate frequency. The amplifying unit amplifies the IF signal with a predetermined amplification factor. The A/D converter converts the IF signal from an analog signal into a digital signal. The demodulating unit demodulates the digital signal. Based on a result of the demodulation by the demodulating unit, the control unit controls an operation of the RF unit.

The filtering unit and the amplifying unit may each be formed with a plurality of stages. The control unit may adjust the number of stages of the filtering unit and the number of stages of the amplifying unit so as to be within a reception frequency bandwidth capable of receiving the reception signal from a particular positioning satellite.

The control unit may adjust a frequency of the local oscillation signal generated by the local oscillation unit so as to be within the reception frequency bandwidth capable of receiving the reception signal from a particular positioning satellite.

The A/D converter may operate using a first clock signal from the local oscillation unit that generates the local oscillation signal, or a second clock signal used in the demodulating unit.

The A/D converter may operate in a first mode or a second mode. The first mode receives only a reception signal from a first positioning satellite. The second mode, while preferentially receiving the reception signal from the first positioning satellite, receives a reception signal from a second positioning satellite in a case where a reception environment of the reception signal from the first positioning satellite is poor.

The first positioning satellite may be a global positioning system (GPS) satellite, and the second positioning satellite may be a global navigation satellite system (GLONASS) satellite, a BeiDou satellite, or a Galileo satellite.

The A/D converter may operate using the first clock signal when operating in the first mode.

The first positioning satellite may be the GPS satellite.

The A/D converter may operate using the second clock signal when operating in the second mode.

The first positioning satellite may be the GPS satellite, and the second positioning satellite may be the GLONASS satellite.

The reception device according to one aspect of the present technology may be an independent device, or may be an internal block that forms one device.

In the reception device according to one aspect of the present technology, there is provided the RF unit that includes the filtering unit, the amplifying unit, and the A/D converter. The filtering unit allows the IF signal to pass within the predetermined band. The IF signal is acquired by mixing the reception signal received from the positioning satellite with the local oscillation signal generated by the local oscillation unit to perform the frequency conversion of the reception signal into the intermediate frequency. The amplifying unit amplifies the IF signal with the predetermined amplification factor. The A/D converter converts the IF signal from the analog signal into the digital signal. Thereafter, the digital signal is demodulated, and the operation of the RF unit is controlled based on the result of the demodulation.

Effects of the Invention

According to one aspect of the present technology, low power consumption can be realized.

The effects of the present technology are not limited to the effects described herein, and may include any of the effects described in the present disclosure.

MODE FOR CARRYING OUT THE INVENTION

Hereinafter, an embodiment of the present technology will be described with reference to the drawings. The description will be made in the following order.

1. System structure
2. Operation in GPS single reception mode
3. Operation in GPS/BeiDou simultaneous reception mode
4. Operation in GPS/GLONASS simultaneous reception mode
5. Structure with common PLL circuit in case of GPS single reception <1. System Structure>
(Structure of Reception Device)

Figure 1:
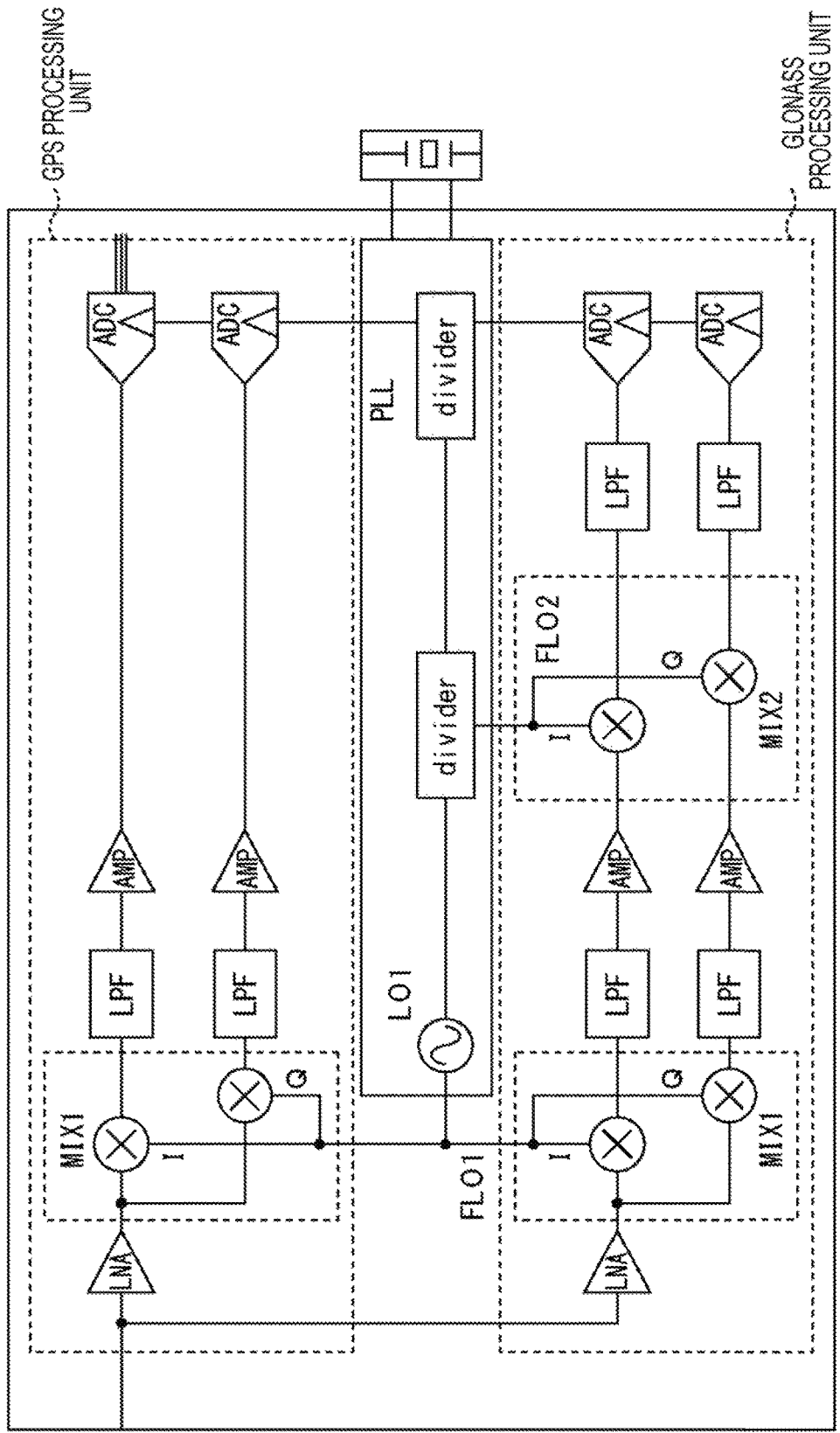
FIG. 1 is a diagram showing a structure of a conventional GNSS receiver.
Figure 2:
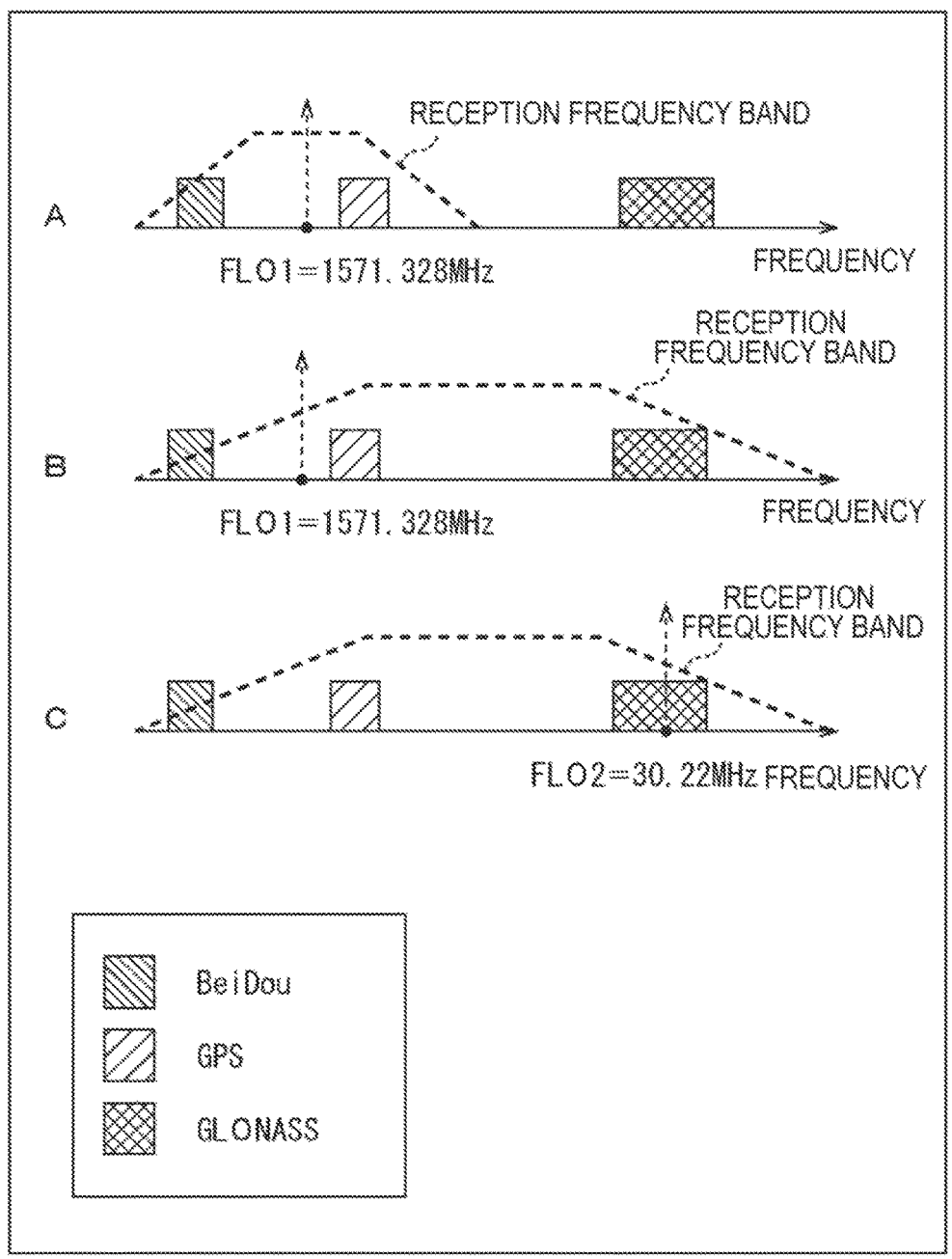
FIG. 2 is a diagram showing a reception frequency band of each satellite positioning system in the conventional GNSS receiver.
Figure 3:
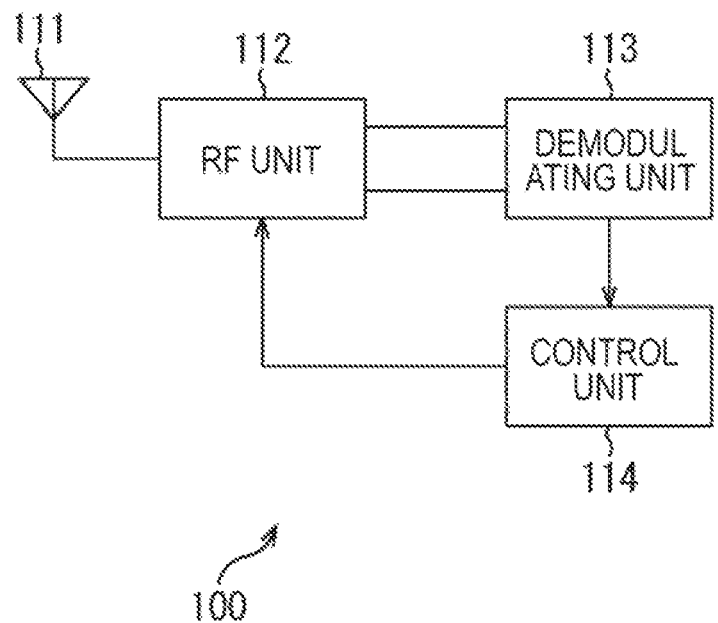
FIG. 3 is a diagram showing a structure of a reception device in an embodiment to which the present technology is applied.

FIG. 3 is a diagram showing a structure of a reception device in an embodiment to which the present technology is applied.

A reception device 100 in FIG. 3 is a GNSS receiver capable of receiving a positioning signal transmitted from a positioning satellite. As shown in FIG. 3, the reception device 100 includes an antenna unit 111, an RF unit 112, a demodulating unit 113, and a control unit 114.

The antenna unit 111 receives the positioning signal transmitted from the positioning satellite such as a GPS satellite, a BeiDou satellite, a GLONASS satellite, or a Galileo satellite, and supplies the positioning signal to the RF unit 112. The positioning signal is a spectrally spread spectrum spread signal, and is a reception signal received by the antenna unit 111. In the following description, there is a case where the reception signal is referred to as a radio frequency (RF) signal.

Under the control of the control unit 114, the RF unit 112 converts a frequency of the reception signal supplied from the antenna unit 111 into an intermediate frequency (IF), thereby converting the RF signal into an IF signal. In addition, under the control of the control unit 114, the RF unit 112 converts the IF signal from an analog signal into a digital signal, and supplies the digital signal to the demodulating unit 113.

The demodulating unit 113 demodulates the digital signal supplied from the RF unit 112, and supplies a result of the demodulation to the control unit 114, and a circuit in the next stage.

The control unit 114 controls an operation of the RF unit 112 based on the result of the demodulation supplied from the demodulating unit 113. For example, depending on a reception state of the positioning signal from the positioning satellite acquired from the result of the demodulation, the control unit 114 adjusts the IF signal, which is acquired by converting the reception signal, by adjusting filtering characteristics of a filtering unit and an amplification factor of the amplifying unit. The filtering unit and the amplifying unit form the RF unit 112. Moreover, the control unit 114 adjusts a frequency of a local oscillation signal used when the reception signal is converted into the IF signal.

(Structure of RF Unit)

Next, a detailed structure of the RF unit 112 in FIG. 3 will be described with reference to FIG. 4.

Figure 4:
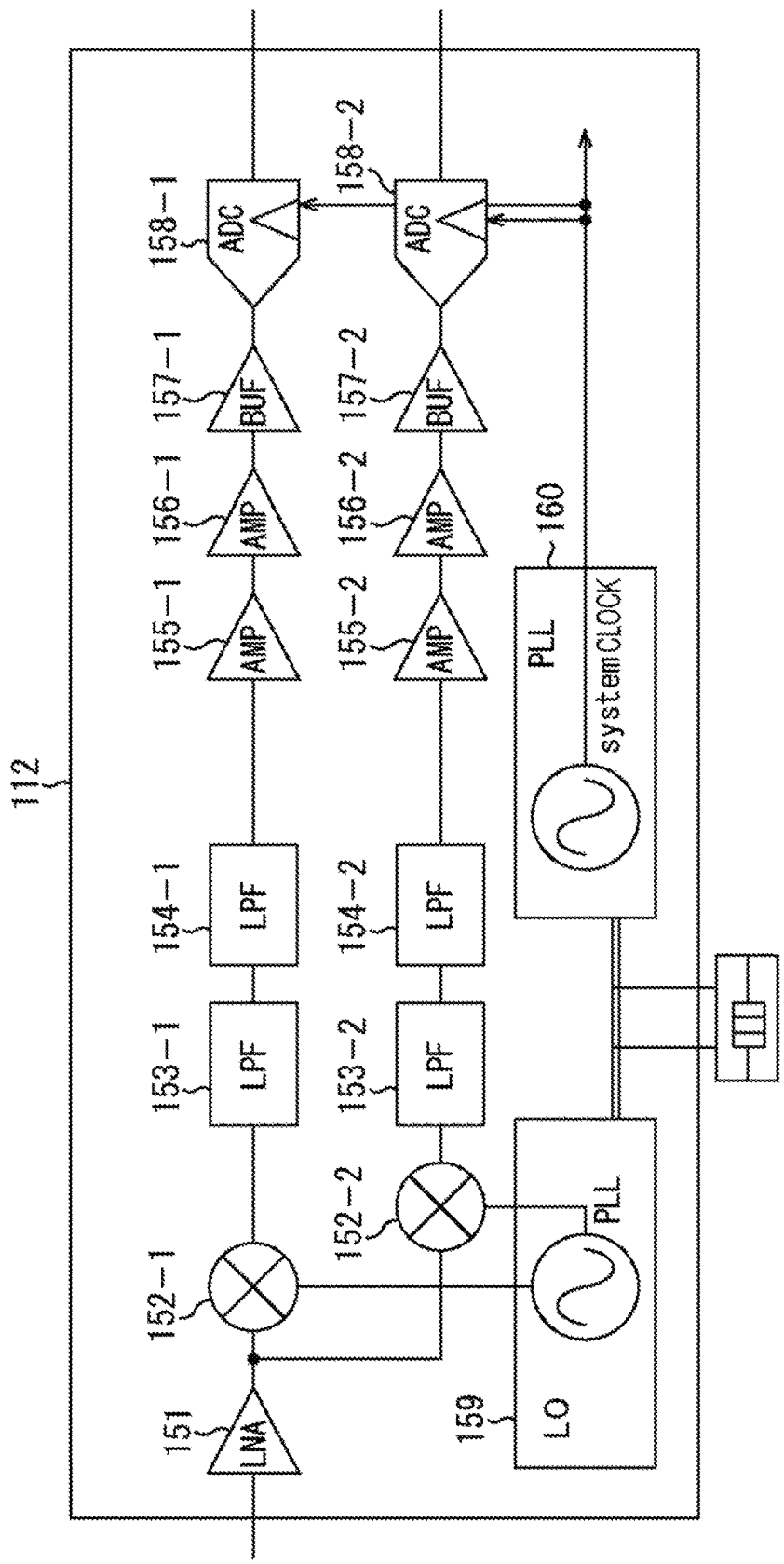
FIG. 4 is a diagram showing a detailed structure of an RF unit.

As shown in FIG. 4, the RF unit 112 includes a low noise amplifier 151, mixers 152-1, 152-2, primary low pass filters 153-1, 153-2, secondary low pass filters 154-1, 154-2, amplifiers 155-1, 155-2, amplifiers 156-1, 156-2, buffers 157-1, 157-2, A/D converters 158-1, 158-2, a PLL 159, and a PLL 160.

The low noise amplifier 151 is a low noise amplifier circuit (LNA) that performs low noise amplification of the reception signal from the antenna unit 111. The reception signal subjected to the low noise amplification performed by the low noise amplifier 151 is supplied to the mixer 152-1 and the mixer 152-2.

The PLL 159 is a phase locked loop (PLL) circuit that synchronously oscillates by multiplying a reference clock signal generated by an oscillator (LO) that generates a signal with a constant oscillation frequency. The signal generated by the PLL 159 is supplied to the mixer 152-1 and the mixer 152-2 as a local oscillation signal. In addition, under the control of the control unit 114, the PLL 159 changes a frequency of the local oscillation signal.

By mixing the reception signal from the low noise amplifier 151 with the local oscillation signal from the PLL 159, the mixer 152-1 and the mixer 152-2 convert a carrier frequency of the reception signal from the low noise amplifier 151 into a lower intermediate frequency, and the IF signal acquired thereby is supplied to the filtering unit in the next stage.

The filtering unit is a low pass filter (LPF) circuit formed with two stages, i.e., the primary low pass filters 153-1, 153-2, and the secondary low pass filters 154-1, 154-2. The primary low pass filters 153-1, 153-2, and the secondary low pass filters 154-1, 154-2, allow the IF signals supplied from the mixers 152-1, 152-2 to pass within a particular frequency band, and attenuate signals with other frequency bands. The IF signal from which a predetermined frequency component has been diminished by the filtering unit is supplied to the amplifying unit in the next stage.

In other words, in the filtering unit, under the control of the control unit 114, the number of stages of the low pass filter formed with two stages, i.e., the primary low pass filters and the secondary low pass filters are adjusted to select the filtering characteristics of a required attenuation amount and thus, the IF signal will be adjusted.

The amplifying unit is an automatic gain control (AGP) amplifier circuit formed with three stages, i.e., the amplifiers 155-1, 155-2, the amplifiers 156-1, 156-2, and the buffers 157-1, 157-2. The amplifiers 155-1, 155-2, the amplifiers 156-1, 156-2, and the buffers 157-1, 157-2 amplify the IF signals supplied from the filtering unit in the previous stage with a predetermined amplification factor. The IF signals amplified by the amplifying unit are supplied to the A/D converter 158-1 and the A/D converter 158-2.

In other words, in the amplifying unit, under the control of the control unit 114, the number of stages of the AGP amplifier formed with three stages, i.e., the amplifiers 155-1, 155-2, the amplifiers 156-1, 156-2, and the buffers 157-1, 157-2 are adjusted to select the required amplification factor and thus, the IF signal will be adjusted.

In accordance with a clock signal for a system from the PLL 160, the A/D converter 158-1 and the A/D converter 158-2 convert the IF signal supplied from the amplifying unit from the analog signal into the digital signal, and supply the digital signal to the demodulating unit 113 in the next stage.

The PLL 160 is the PLL circuit that synchronously oscillates by multiplying the reference clock signal generated by the oscillator that generates the signal with the constant oscillation frequency. The signal generated by the PLL 160 is supplied, as the clock signal for a system, to the demodulating unit 113 in the next stage, and to the A/D converter 158-1 and the A/D converter 158-2.

In the following description, when there is no need to distinguish between the mixer 152-1 and the mixer 152-2, the mixers are referred to as a mixer 152. In addition, when there is no need to distinguish between the primary low pass filter 153-1 and the primary low pass filter 153-2, and between the secondary low pass filter 154-1 and the secondary low pass filter 154-2, the low pass filters are referred to as a primary low pass filter 153 and a secondary low pass filter 154, respectively.

Moreover, when there is no need to distinguish between the amplifier 155-1 and the amplifier 155-2, between the amplifier 156-1 and the amplifier 156-2, and between the buffer 157-1 and the buffer 157-2, the amplifiers and the buffers are referred to as an amplifier 155, an amplifier 156, and a buffer 157, respectively. Furthermore, when there is no need to distinguish between the A/D converter 158-1 and the A/D converter 158-2, the A/D converters are referred to as an A/D converter 158.

The frequencies of the corresponding GNSS are 1573.374 to 1577.466 MHz for the GPS, 1597.374 to 1605.886 MHz for the GLONASS, 1559.052 to 1563.144 MHz for the BeiDou, and 1573.374 to 1577.466 MHz for the Galileo. The reception device 100 has functions of simultaneously receiving the positioning signals (reception signals) transmitted from the number of positioning satellites, and receiving with low power consumption.

In other words, as apparent from the relations between the frequencies of the corresponding GNSS, in a case of receiving only the positioning signal transmitted from the GPS satellite, about 4 MHz is required as the reception frequency bandwidth, and in a case of receiving a signal band that includes the positioning signals from the GLONASS satellite and the BeiDou satellite, the reception frequency bandwidth becomes about 46 MHz. Therefore, the bandwidth becomes about 10 times in comparison with the case of receiving only the positioning signal from the GPS satellite.

Generally, when the reception frequency band of the reception device 100 is set to be wide, the power consumption in the reception device 100 remarkably increases. In the reception device 100, the reception of the positioning signals from the GLONASS satellite and the BeiDou satellite is required mainly when a reception environment of the positioning signal from the GPS satellite is poor. Therefore, in a normal reception operation, as long as the reception device 100 can receive the positioning signal from the GPS satellite, the performance thereof is sufficient.

Accordingly, during the normal time, the reception device 100 operates in a mode of receiving only the positioning signal from the GPS satellite (hereinafter, referred to as a "GPS single reception mode") so as to reduce the power consumption. On the other hand, in the case where the reception environment of the positioning signal from the GPS satellite is poor, the reception device 100 changes to a mode of also receiving the positioning signal from the BeiDou satellite (hereinafter referred to as a "GPS/BeiDou simultaneous reception mode") or to a mode of also receiving the positioning signal from the GLONASS satellite (hereinafter referred to as a "GPS/GLONASS simultaneous reception mode") so as to improve the reception performance.

As a result, in the reception device 100, the reception performance for the positioning signals can be adaptively improved by switching the reception mode depending on the reception environment of the positioning signal transmitted from the positioning satellite. Therefore, both the operation with low power consumption and the operation of receiving the positioning signal with high sensitivity can be realized. Hereinafter, detailed contents of the operation of the reception device 100 according to each reception mode will be described.

<2. Operation in GPS Single Reception Mode>

Figure 5:
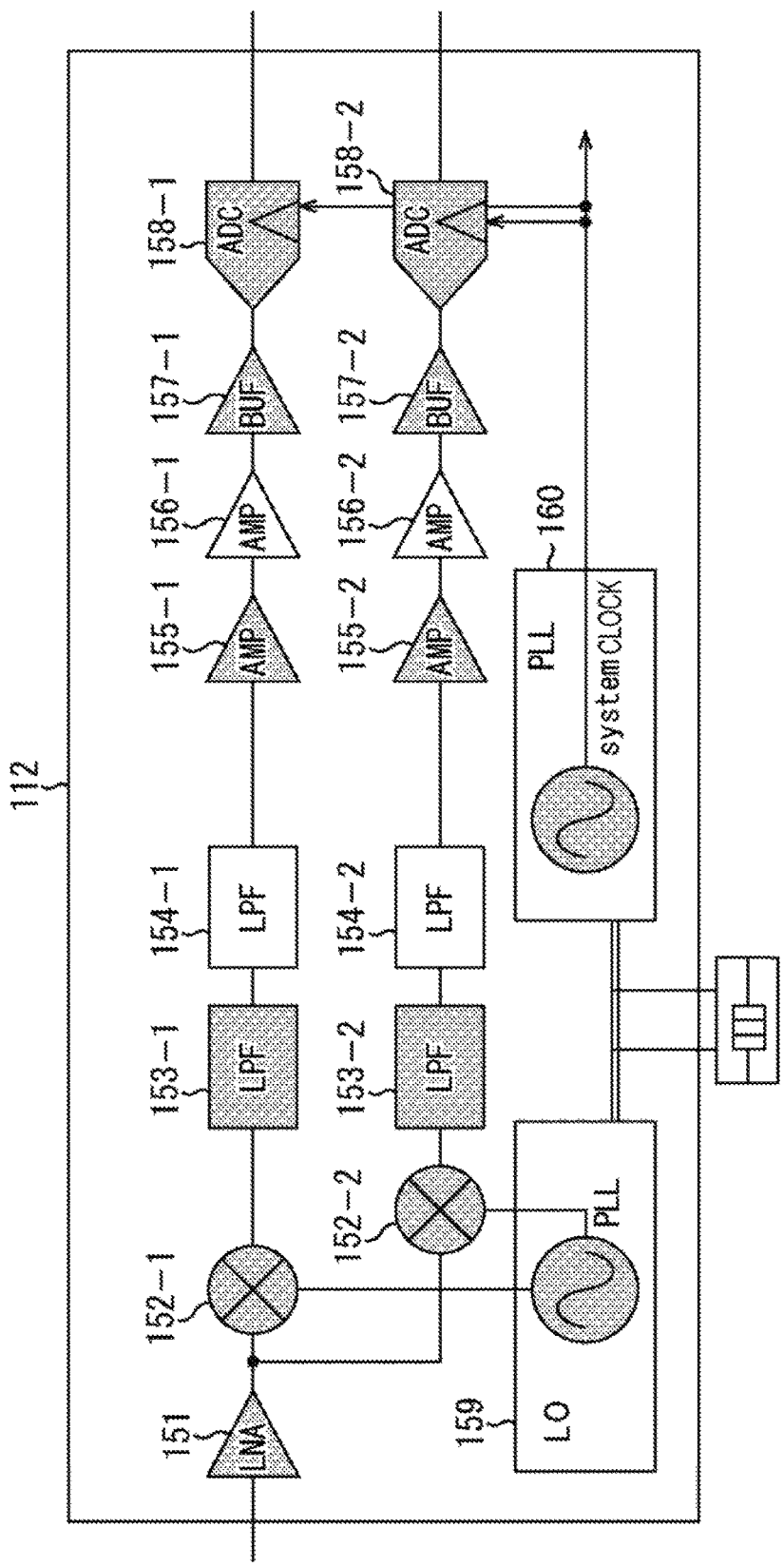
FIG. 5 is a diagram showing an operation of the RF unit in a case where a GPS single reception mode is set.

First, a case where the reception device 100 operates in the GPS single reception mode will be described. FIG. 5 is a diagram showing an operation of the RF unit 112 in the case where the GPS single reception mode is set.

In the RF unit 112 in FIG. 5, under the control of the control unit 114, only circuits colored for distinguishing an operation/non-operation state are operating. The meaning of the color for distinguishing the operation/non-operation state is the same in the other drawings described later.

That is, as shown in FIG. 5, in the filtering unit, in the two-stage filter formed with the primary low pass filter 153 and the secondary low pass filter 154, only one stage, i.e., the primary low pass filter 153 is operating. Moreover, in the amplifying unit, in the three-stage amplifier formed with the amplifier 155, the amplifier 156, and the buffer 157, only two stages, i.e., the amplifier 155 and the buffer 157 are operating.

Furthermore, under the control of the control unit 114, the PLL 159 supplies a local oscillation signal of 1571.328 MHz to the mixer 152.

As described above, in the RF unit 112 in FIG. 5, the reception signal amplified by the low noise amplifier 151 is mixed with the local oscillation signal (1571.328 MHz) by the mixer 152, and is converted into the IF signal (IF signal of about 4 MHz). The IF signal is adjusted by the filtering unit in which only one stage out of the two-stage filter is operating and by the amplifying unit in which only two stages out of the three-stage amplifier are operating. Then, the IF signal is converted from the analog signal into the digital signal by the A/D converter 158.

Figure 6:
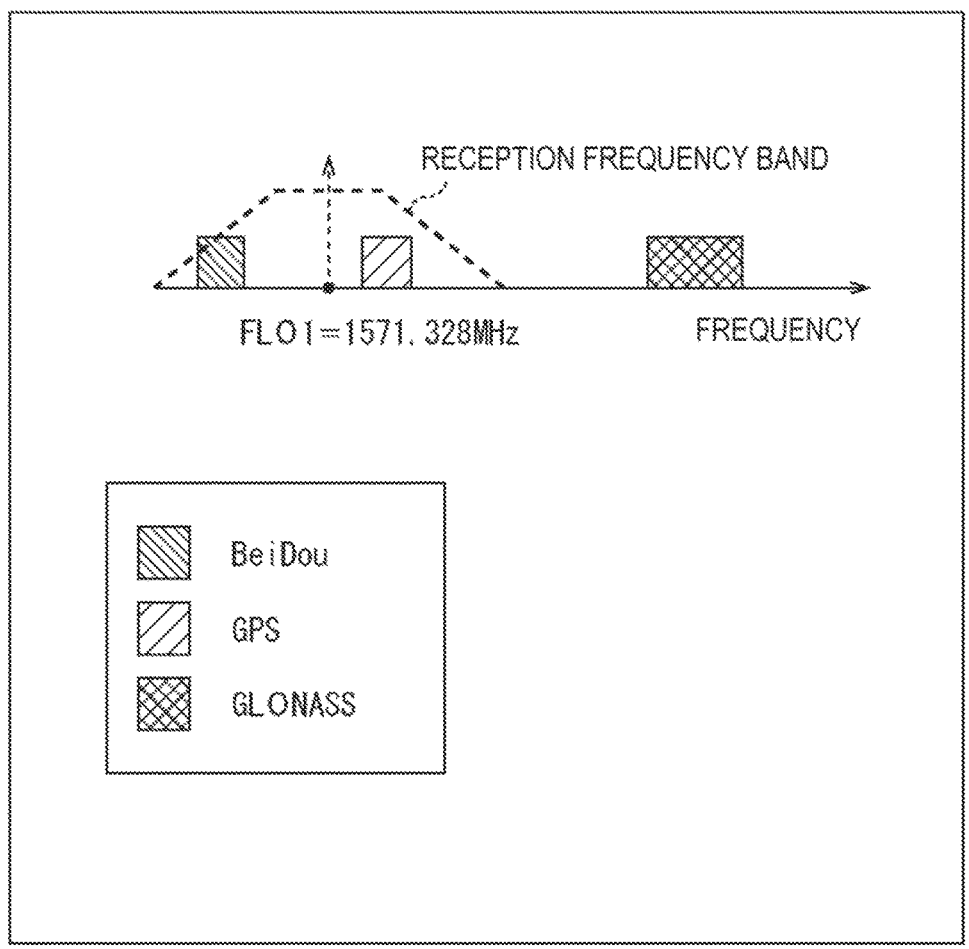
FIG. 6 is a diagram showing a reception frequency band in a case of operating in the GPS single reception mode.

FIG. 6 is a diagram showing a reception frequency band in the case where the reception device 100 operates in the GPS single reception mode.

A dotted line in the drawing represents the reception frequency band in the case where the filtering unit is adjusted to have the filtering characteristics according to the selection of the number of stages (selecting one stage out of the two stages), and where the amplifying unit is adjusted to have the amplification factor according to the selection of the number of stages (selecting two stages out of three stages). In addition, in the reception device 100 that operates in the GPS single reception mode, only the signal band (1573.374 to 1577.466 MHz) of the positioning signal from the GPS satellite is received.

As described above, in the RF unit 112, by adjusting the numbers of stages of the filtering unit and the amplifying unit, in the reception device 100, only the positioning signal from the GPS satellite is received during the operation in the GPS single reception mode. Moreover, in the reception device 100 that operates in the GPS single reception mode, the numbers of stages of the filtering unit and the amplifying unit are reduced. Therefore, the operation with low power consumption is possible.

<3. Operation in GPS/BeiDou Simultaneous Reception Mode>

Figure 7:
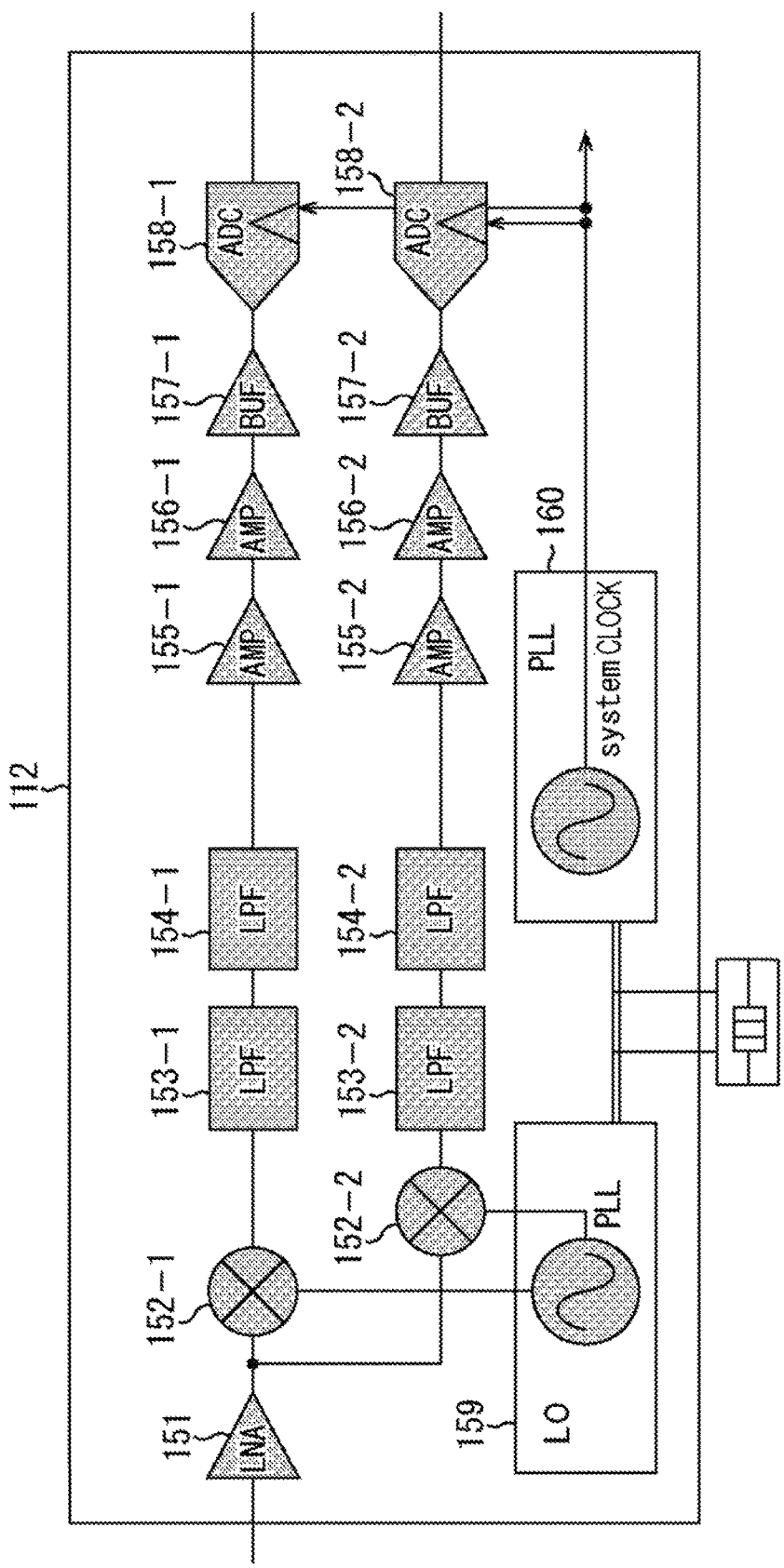
FIG. 7 is a diagram showing an operation of the RF unit in a case where a GPS/BeiDou simultaneous reception mode is set.

Next, a case where the reception device 100 operates in the GPS/BeiDou simultaneous reception mode will be described. FIG. 7 is a diagram showing an operation of the RF unit 112 in the case where the GPS/BeiDou simultaneous reception mode is set.

In the filtering unit of the RF unit 112 in FIG. 7, in the two-stage filter formed with the primary low pass filter 153 and the secondary low pass filter 154, the primary low pass filter 153 and the secondary low pass filter 154 are both operating. Moreover, in the amplifying unit, in the three-stage amplifier formed with the amplifier 155, the amplifier 156, and the buffer 157, the amplifier 155, the amplifier 156, and the buffer 157 are all operating.

Furthermore, under the control of the control unit 114, the PLL 159 supplies a local oscillation signal of 1571.328 MHz to the mixer 152.

As described above, in the RF unit 112 in FIG. 7, the reception signal amplified by the low noise amplifier 151 is mixed with the local oscillation signal (1571.328 MHz) by the mixer 152, and is converted into an IF signal. The IF signal is adjusted by the filtering unit in which all of the two-stage filters are operating and by the amplifying unit in which all of the three-stage amplifiers are operating. Then, the IF signal is converted from the analog signal into the digital signal by the A/D converter 158.

Figure 8:
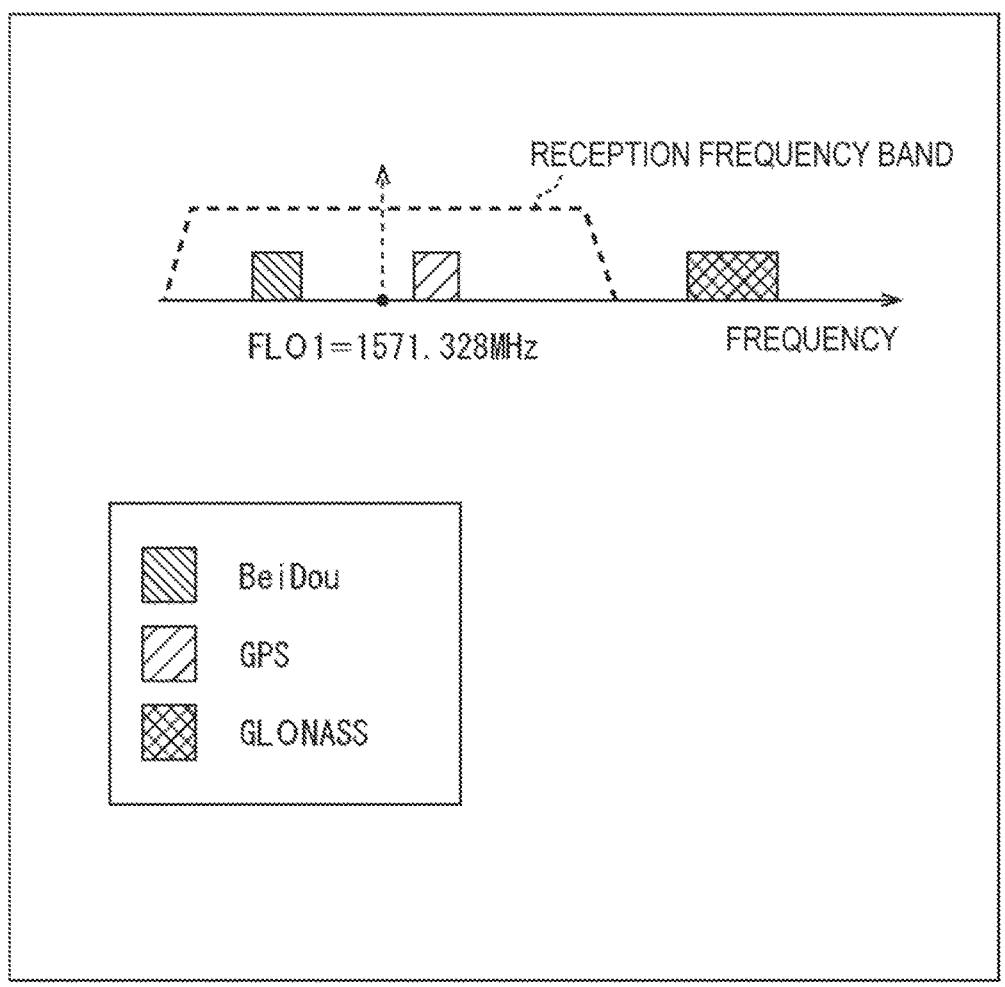
FIG. 8 is a diagram showing a reception frequency band in a case of operating in the GPS/BeiDou simultaneous reception mode.

FIG. 8 is a diagram showing a reception frequency band in the case where the reception device 100 operates in the GPS/BeiDou simultaneous reception mode.

A dotted line in the drawing represents the reception frequency band in the case where the filtering unit is adjusted to have the filtering characteristics according to the selection of the number of stages (selecting all of the two stages), and where the amplifying unit is adjusted to have the amplification factor according to the selection of the number of stages (selecting all of the three stages). In addition, in the reception device 100 that operates in the GPS/BeiDou simultaneous reception mode, not only the signal band (1573.374 to 1577.466 MHz) of the positioning signal from the GPS satellite but also the signal band (1559.052 to 1563.144 MHz) of the positioning signal from the BeiDou satellite is received.

In other words, in order to receive not only the positioning signal from the GPS satellite but also the positioning signal from the BeiDou satellite, a broader signal band is required as compared with the GPS single reception mode described above. Therefore, the filtering unit operates all of the two stages in order to broaden a pass band and secure selectivity. Furthermore, the amplifying unit operates all of the three stages in order to broaden the reception frequency bandwidth.

As described above, in the RF unit 112, by adjusting the numbers of stages of the filtering unit and the amplifying unit, the reception frequency bandwidth is broadened. Therefore, in the reception device 100, not only the positioning signal from the GPS satellite but also the positioning signal from the BeiDou satellite is received. As a result, the positioning signals from the plurality of positioning satellites can be received with high sensitivity.

<4. Operation in GPS/GLONASS Simultaneous Reception Mode>

Figure 9:
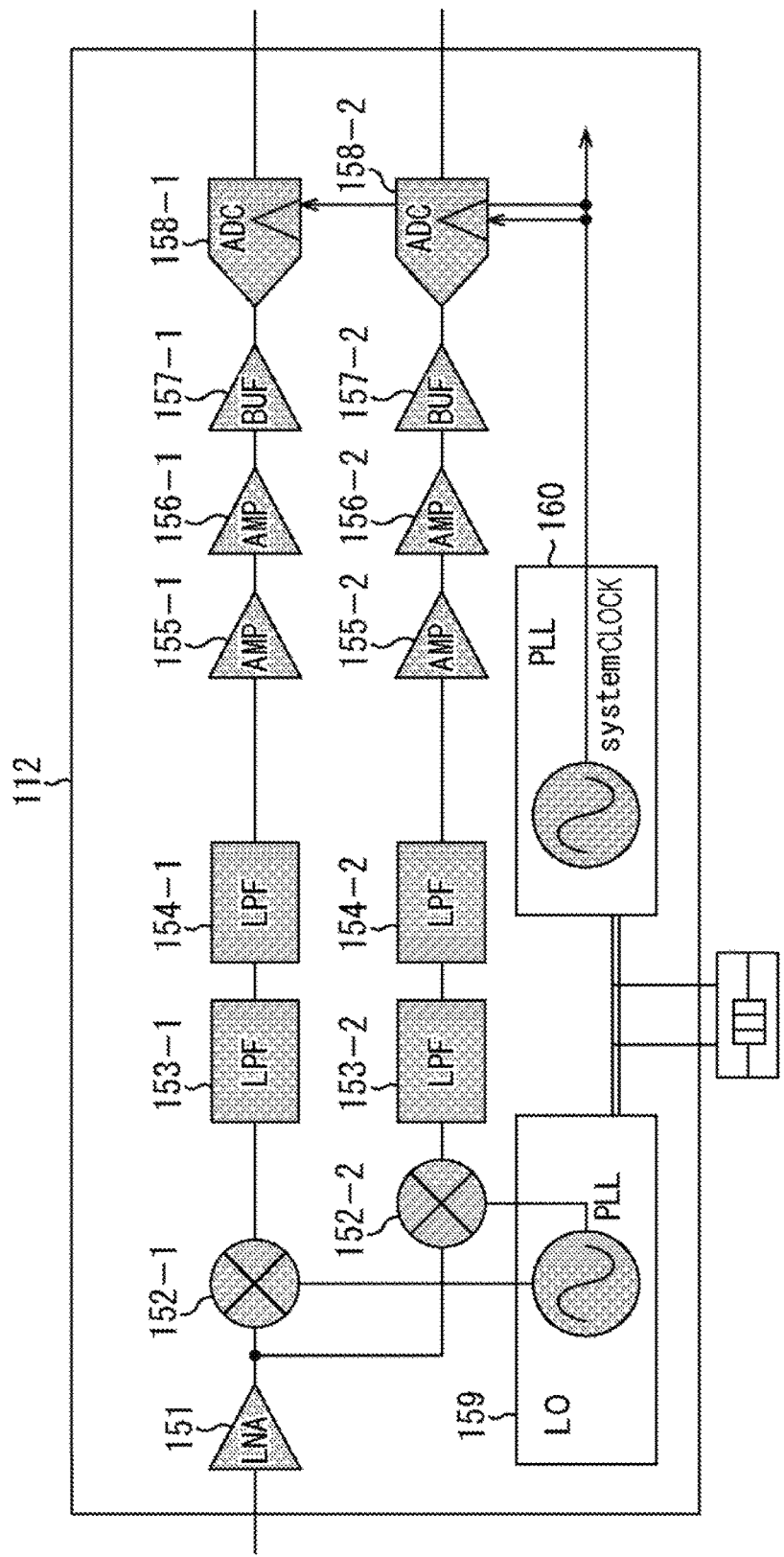
FIG. 9 is a diagram showing an operation of the RF unit in a case where a GPS/GLONASS simultaneous reception mode is set.

Lastly, a case where the reception device 100 operates in the GPS/GLONASS simultaneous reception mode will be described. FIG. 9 is a diagram showing an operation of the RF unit 112 in the case where the GPS/GLONASS simultaneous reception mode is set.

In the filtering unit of the RF unit 112 in FIG. 9, in the two-stage filter formed with the primary low pass filter 153 and the secondary low pass filter 154, the primary low pass filter 153 and the secondary low pass filter 154 are both operating. Moreover, in the amplifying unit, in the three-stage amplifier formed with the amplifier 155, the amplifier 156, and the buffer 157, the amplifier 155, the amplifier 156, and the buffer 157 are all operating.

Furthermore, under the control of the control unit 114, the PLL 159 supplies a local oscillation signal of 1587.696 MHz to the mixer 152.

As described above, in the RF unit 112 in FIG. 9, the reception signal amplified by the low noise amplifier 151 is mixed with the local oscillation signal (1587.696 MHz) by the mixer 152, and is converted into an IF signal. The IF signal is adjusted by the filtering unit in which all of the two-stage filters are operating and by the amplifying unit in which all of the three-stage amplifiers are operating. Then, the IF signal is converted from the analog signal into the digital signal by the A/D converter 158.

Figure 10:
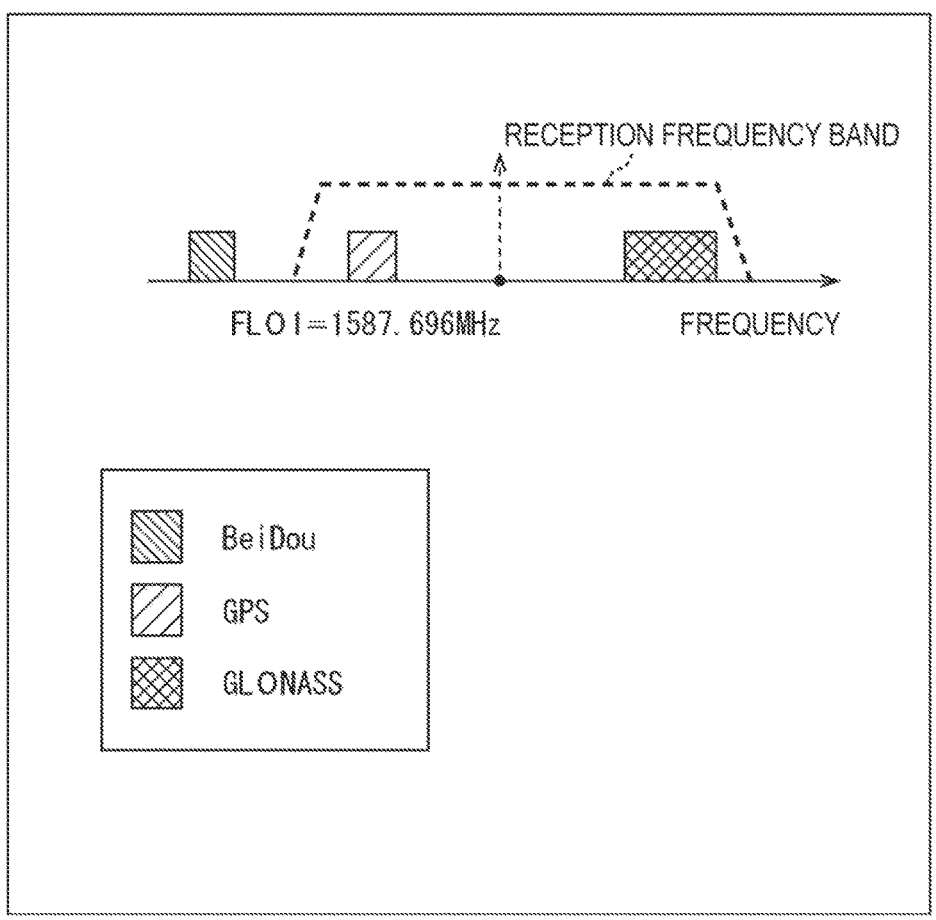
FIG. 10 is a diagram showing a reception frequency band in a case of operating in the GPS/GLONASS simultaneous reception mode.

FIG. 10 is a diagram showing a reception frequency band in the case where the reception device 100 operates in the GPS/GLONASS simultaneous reception mode.

A dotted line in the drawing represents the reception frequency band in the case where the filtering unit is adjusted to have the filtering characteristics according to the selection of the number of stages (selecting all of the two stages), and where the amplifying unit is adjusted to have the amplification factor according to the selection of the number of stages (selecting all of the three stages). In addition, in the reception device 100 that operates in the GPS/GLONASS simultaneous reception mode, not only the signal band (1573.374 to 1577.466 MHz) of the positioning signal from the GPS satellite but also a signal band (1597.374 to 1605.886 MHz) of the positioning signal from the GLONASS satellite is received.

In other words, in order to receive not only the positioning signal from the GPS satellite but also the positioning signal from the GLONASS satellite, a broader signal band is required as compared with the GPS single reception mode described above. Therefore, in the filtering unit, all of the two stages are operated in order to broaden a pass band and secure selectivity. Furthermore, in the amplifying unit, all of the three stages are operated in order to broaden the reception frequency bandwidth. In addition, a frequency of the local oscillation signal is set to 1587.696 MHz and thus, a center position of the reception frequency bandwidth is shifted.

As described above, in the RF unit 112, by adjusting the numbers of stages of the filtering unit and the amplifying unit and furthermore, adjusting the frequency of the local oscillation signal, the reception frequency bandwidth and the center position thereof are adjusted. Therefore, in the reception device 100, not only the positioning signal from the GPS satellite but also the positioning signal from the GLONASS satellite is received. As a result, the positioning signals from the plurality of positioning satellites can be received with high sensitivity.

<5. Structure with Common PLL Circuit in Case of GPS Single Reception>

In the RF unit 112 in FIG. 4 described above, the structure provided with the PLL 159 that generates the local oscillation signal and with the PLL 160 that generates the clock signal used in the A/D converter 158 has been described. However, the clock signal used in the A/D converter 158 may be generated in the PLL 159.

Figure 11:
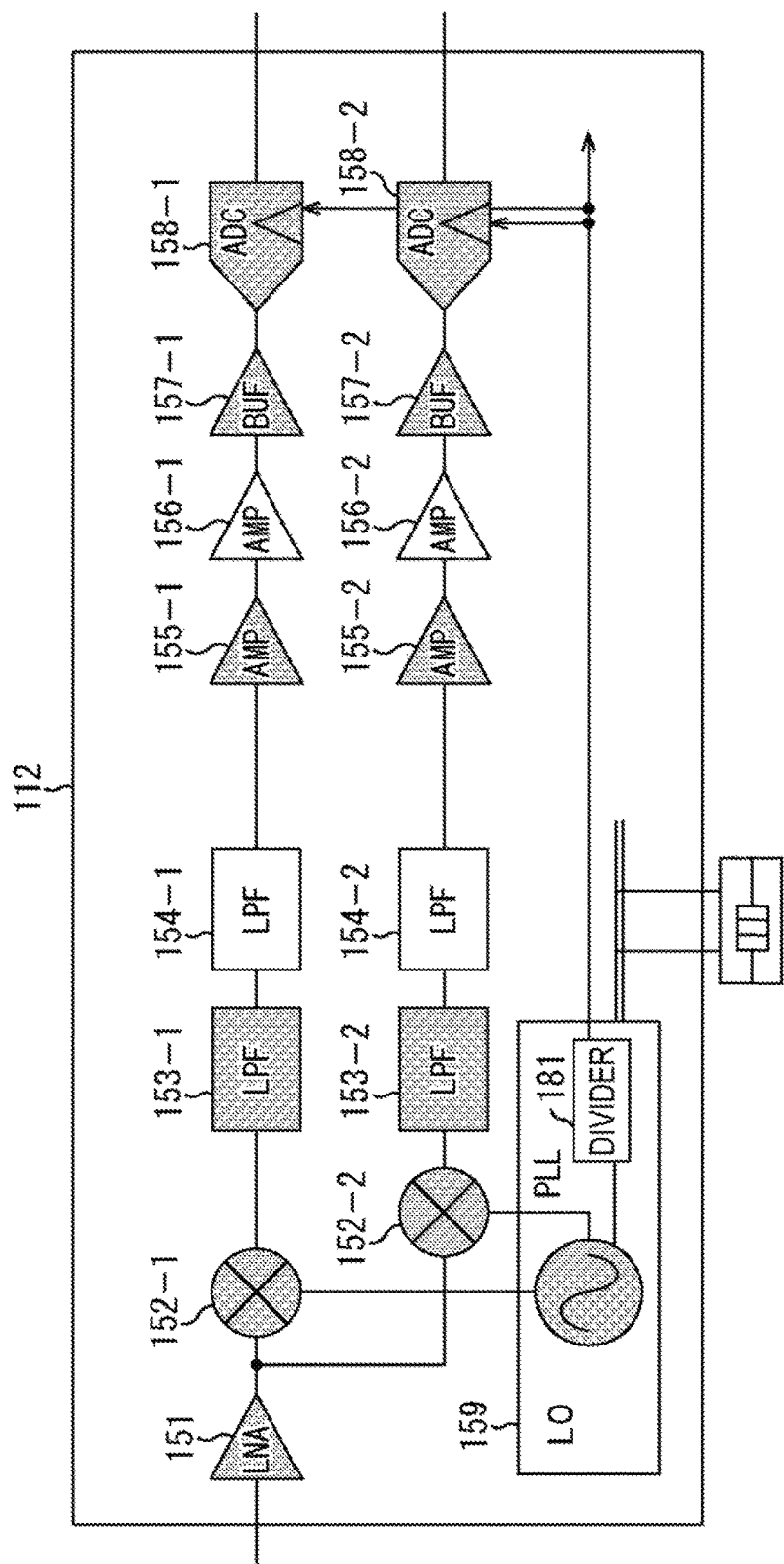
FIG. 11 is a diagram showing a structure with a common PLL circuit in the case of setting the GPS single reception mode

FIG. 11 is a diagram showing a structure of an RF unit in a case where a PLL circuit is made to be common.

In the RF unit 112 in FIG. 11, the clock signal generated by the PLL 159 is supplied to the A/D converter 158. In accordance with the clock signal from the PLL 159, the A/D converter 158 converts the IF signal, which is supplied from the amplifying unit in the previous stage, from the analog signal into the digital signal.

However, in the PLL 159, a clock signal is supplied to the A/D converter 158. The clock signal has a frequency acquired by dividing, by a divider 181, a frequency of a signal which is acquired by multiplying a reference clock signal generated by the oscillator (LO) that generates the signal with the constant oscillation frequency.

The structure of the RF unit 112 in FIG. 11 can be used only in the case where the reception device 100 operates in the GPS single reception mode. This is because, in the case where the reception device 100 operates in the GPS/GLONASS simultaneous reception mode, when the reception environment of the positioning signal from the GPS satellite is poor, the reception device 100 receives the positioning signal from the GLONASS satellite, and at the time of switching, there is a case where the synchronization of the clock signal may be lost due to a change in the local oscillation signal.

Figure 12:
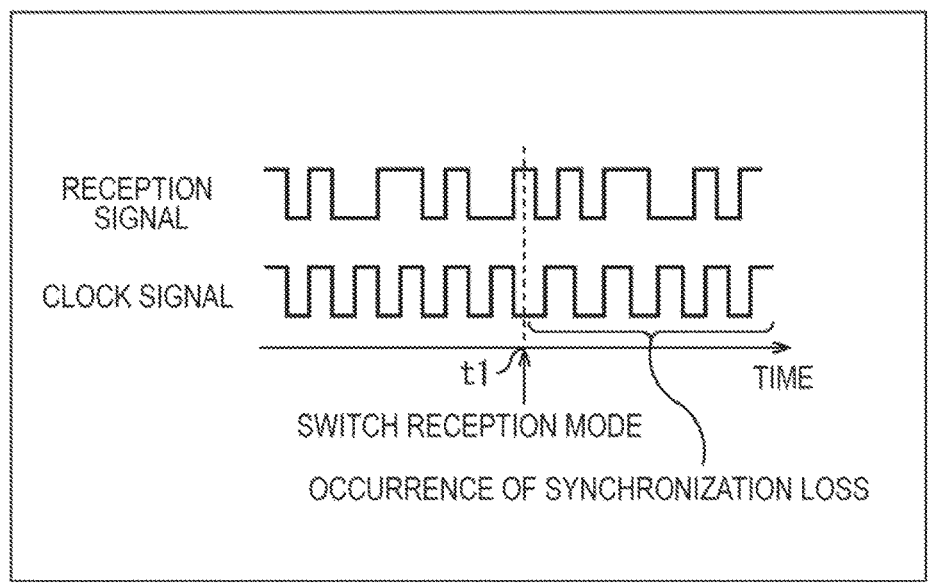
FIG. 12 is a timing chart showing a case where synchronization is lost at the time of switching the reception mode.

Specifically, as shown in a timing chart in FIG. 12, when a direction from the left to the right is referred to as a direction of time in the drawing, at time t1, the local oscillation signal generated by the PLL 159 changes from 1571.328 MHz to 1587.696 MHz at the time the reception mode has been switched from the GPS satellite to the GLONASS satellite. As a result, continuity of the clock signal generated by the PLL 159 and used in the A/D converter 158 is lost and thus, the synchronization with the reception signal will be lost. In other words, in the timing chart in FIG. 12, the reception signal and the clock signal are synchronized before the switching of the reception mode; however, the synchronization loss occurs in the clock signal after the switching of the reception mode.

As described above, in the case where the reception device 100 operates in the GPS/GLONASS simultaneous reception mode, the synchronization loss occurs in the clock signal due to the switching of the local oscillation signal. Therefore, it is not possible to use the structure of the RF unit 112 in FIG. 11. On the other hand, in the case where the reception device 100 operates in the GPS single reception mode, the synchronization loss between the reception signal and the clock signal does not occur because the switching of the local oscillation signal is not performed. Therefore, it is possible to use the structure of the RF unit 112 in FIG. 11.

Figure 13:
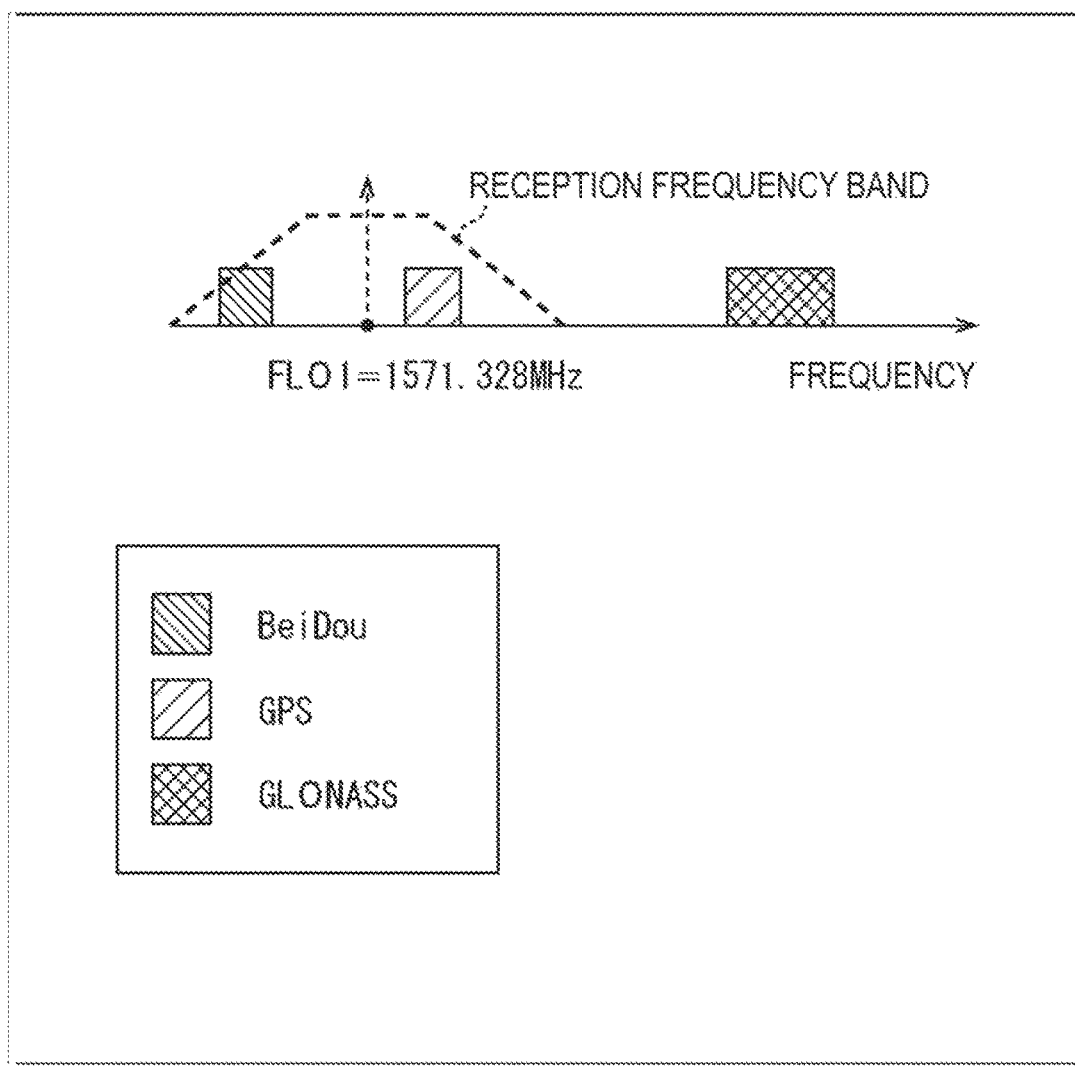
FIG. 13 is a diagram showing a reception frequency band when the PLL circuit is made to be common in the case of setting the GPS single reception mode.

Accordingly, in the RF unit 112 in FIG. 11, same as in the RF unit 112 (FIG. 5) in the case where the GPS single reception mode is set thereto, in the filtering unit, out of the two-stage filter, i.e., the primary low pass filter 153 and the secondary low pass filter 154, only one stage, i.e., the primary low pass filter 153 is operating. Moreover, in the amplifying unit, out of the three-stage amplifier, i.e., the amplifier 155, the amplifier 156, and the buffer 157, only two stages, i.e., the amplifier 155 and the buffer 157 are operating. As shown in FIG. 13, in the case where the reception device 100 operates in the GPS single reception mode, only the signal band (1573.374 to 1577.466 MHz) of the positioning signal from the GPS satellite is received in the reception device 100.

Description has been made that, in the case where the reception device 100 operates in the GPS/GLONASS simultaneous reception mode, it is not possible to use the structure of the RF unit 112 (FIG. 11) with the common PLL circuit. However, in such case, the structure of the RF unit 112 (FIG. 9) in the case where the GPS/GLONASS simultaneous reception mode is set, as described above, should be used. In the RF unit 112 in FIG. 9, the clock signal generated by the PLL 160 is supplied to the A/D converter 158. Thereafter, in accordance with the clock signal from the PLL 160, the A/D converter 158 converts the IF signal, which is supplied from the amplifying unit, from the analog signal into the digital signal.

Figure 14:
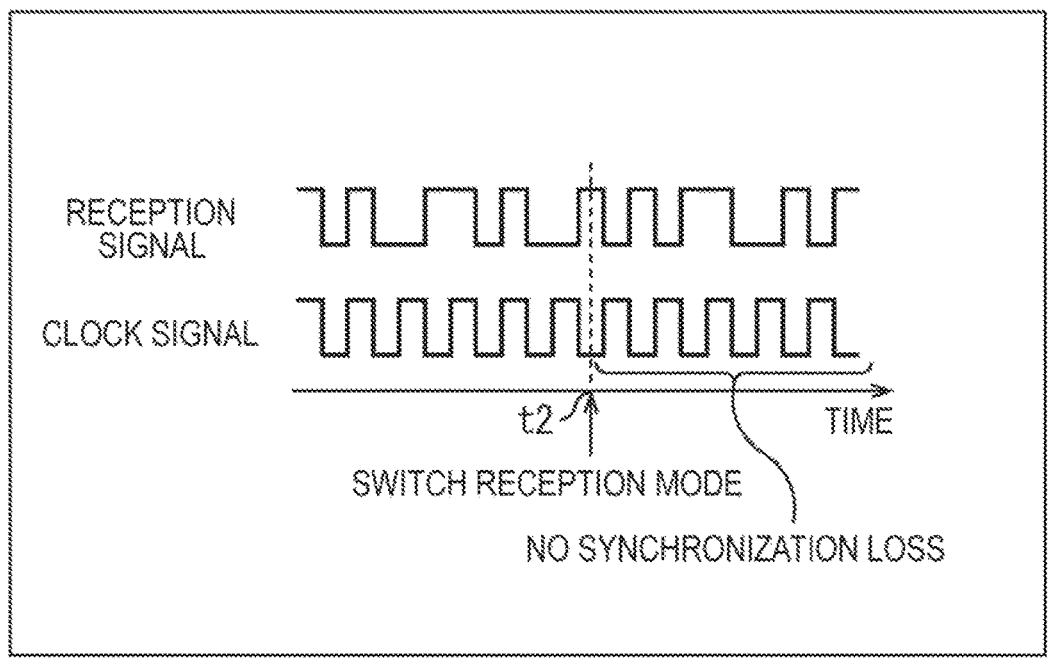
FIG. 14 is a timing chart showing a case where synchronization is not lost at the time of switching the reception mode.

In such case, as shown in a timing chart in FIG. 14, at time t2, the local oscillation signal generated by the PLL 159 changes from 1571.328 MHz to 1587.696 MHz at the time the reception mode has been switched from the GPS satellite to the GLONASS satellite. However, since the A/D converter 158 operates in accordance with the clock signal from the PLL 160, the continuity of the clock signal used in the A/D converter 158 is maintained and thus, the synchronization with the reception signal will not be lost.

Even in the case where the GPS/BeiDou simultaneous reception mode is set in the reception device 100, the synchronization loss between the reception signal and the clock signal does not occur because the switching of the local oscillation signal generated in the PLL 159 is not performed when the reception mode is switched from the GPS satellite to the BeiDou satellite. Therefore, it is possible to use the structure of the RF unit 112 in FIG. 11.

As described above, in the case of operating in the GPS single reception mode or the GPS/BeiDou simultaneous reception mode and not changing to the GPS/GLONASS simultaneous reception mode, by using the structure of the RF unit 112 (FIG. 11) with the common PLL circuit, the power consumption can be reduced since the PLL 160 is not operated.

As described above, in the reception device 100 to which the present technology is applied, an IF signal unit is capable of receiving the positioning signals from the plurality of positioning satellites by one system, instead of two or more systems as conventionally required. Therefore, it is possible to realize the low power consumption, reduction in circuit size, and reduction in cost. In addition, by changing the number of stages of the filtering unit (LPF) and the number of stages of the amplifying unit (AGCAMP) between the case of operating in the GPS single reception mode and the case of operating in the GPS/BeiDou simultaneous reception mode or the GPS/GLONASS simultaneous reception mode, it is possible to realize the low power consumption when operating in the GPS single reception mode.

Moreover, by providing the PLL 160 that generates the clock signal used in the A/D converter 158 in addition to the PLL 159 that generates the local oscillation signal, the continuity of the clock signal used in the A/D converter 158 is maintained even in the case where the reception mode has been changed from the GPS single reception mode to the GPS/GLONASS simultaneous reception mode, for example. Furthermore, in the case of operating only in the GPS single reception mode, by making the PLL circuit common, stopping the clock signal from the PLL 160, and causing the oscillator (LO1) of the PLL 159 to generate the clock signal used in the A/D converter 158, the PLL 160 becomes unnecessary. Accordingly, it is possible to realize the low power consumption.

In the description above, the number of stages of the filter in the filtering unit has been three and the number of stages of the amplifier in the amplifying unit has been three. However, the number of stages of the filter and the number of stages of the amplifier can be set to any number according to the filtering characteristics, the amplification factor, and the like. Moreover, in the description above, there has been described the reception mode in which the positioning signal from the BeiDou satellite or the GLONASS satellite is received in the case where the reception environment of the positioning signal from the GPS satellite is poor. However, the positioning signal from the Galileo satellite may be received instead of the BeiDou satellite or the GLONASS satellite.

An embodiment of the present technology is not limited to the embodiment described above, and various modifications may be made without departing from the scope of the present technology.

The present technology may also be embodied in the structures described below.

(1)

A reception device including:

a radio frequency (RF) unit that includes a filtering unit that allows an intermediate frequency (IF) signal, which is acquired by mixing a reception signal received from a positioning satellite with a local oscillation signal generated by a local oscillation unit to perform frequency conversion of the reception signal into the intermediate frequency, to pass within a predetermined band, an amplifying unit that amplifies the IF signal with a predetermined amplification factor, and an A/D converter that converts the IF signal from an analog signal into a digital signal;

a demodulating unit that demodulates the digital signal; and a control unit that controls an operation of the RF unit based on a result of the demodulation by the demodulating unit.

(2)

The reception device according to (1), wherein the filtering unit and the amplifying unit are each formed with a plurality of stages, and the control unit adjusts the number of stages of the filtering unit and the number of stages of the amplifying unit such that a reception frequency bandwidth capable of receiving the reception signal from a particular positioning satellite is set.

(3)

The reception device according to (1) or (2), wherein the control unit adjusts a frequency of the local oscillation signal generated by the local oscillation unit such that the reception frequency bandwidth capable of receiving the reception signal from a particular positioning satellite is set.

(4)

The reception device according to anyone of (1) to (3), wherein
the A/D converter operates using a first clock signal from the local oscillation unit that generates the local oscillation signal, or a second clock signal used in the demodulating unit.

(5)

The reception device according to any one of (1) to (4), wherein
the reception device operates in:
a first mode of receiving only a reception signal from a first positioning satellite; or
a second mode of, while preferentially receiving the reception signal from the first positioning satellite, receiving a reception signal from a second positioning satellite in a case where a reception environment of the reception signal from the first positioning satellite is poor.

(6)

The reception device according to (5), wherein
the first positioning satellite is a global positioning system (GPS) satellite, and
the second positioning satellite is a global navigation satellite system (GLONASS) satellite, a BeiDou satellite, or a Galileo satellite.

(7)

The reception device according to (5), wherein
the A/D converter operates using the first clock signal when operating in the first mode.

(8)

The reception device according to (7), wherein
the first positioning satellite is the GPS satellite.

(9)

The reception device according to (5), wherein
the A/D converter operates using the second clock signal when operating in the second mode.

(10)

The reception device according to (9), wherein
the first positioning satellite is the GPS satellite, and
the second positioning satellite is the GLONASS satellite.

REFERENCE SIGNS LIST

100 Reception device
111 Antenna unit
112 RF unit
113 Demodulating unit
114 Control unit
151 Low noise amplifier
152-1, 152-2, 152 Mixer
153-1, 153-2, 153 Primary low pass filter
154-1, 154-2, 154 Secondary low pass filter
155-1, 155-2, 155 Amplifier
156-1, 156-2, 156 Amplifier
157-1, 157-2, 157 Buffer
158-1, 158-2, 158 A/D converter
159 PLL
160 PLL
181 Divider

The invention claimed is:

1. A reception device, comprising:
a radio frequency (RF) device that includes:
a filter configured to pass an intermediate frequency (IF) signal within a band, wherein the IF signal is acquired by mixing operation of a reception signal received from a positioning satellite and a local oscillation signal generated by an oscillator,
wherein the RF device is configured to convert a first frequency the reception signal into a second frequency of the intermediate frequency;
an amplifier configured to amplify the IF signal from the filter, with an amplification factor, and
an A/D converter configured to convert the amplified IF signal from an analog signal into a digital signal;
a demodulator configured to demodulate the digital signal; and
a controller configured to control an operation of the RF device based on the demodulation.

2. The reception device according to claim 1,
wherein each of the filter and the amplifier comprises a plurality of stages, and
wherein the controller is further configured to adjust a number of the plurality of stages of the filter and a number of the plurality of stages of the amplifier, to set a reception frequency bandwidth to receive the reception signal from a corresponding positioning satellite.

3. The reception device according to claim 2,
wherein the controller is further configured to adjust a frequency of the local oscillation signal generated by the oscillator, to set the reception frequency bandwidth to receive the reception signal from the corresponding positioning satellite.

4. The reception device according to claim 3,
wherein the A/D converter is further configured to operate based on one of a first clock signal from the oscillator, or a second clock signal used in the demodulator.

5. The reception device according to claim 4, wherein
the reception device operates in one of:
a first mode to receive a first reception signal from a first positioning satellite; or
a second mode to receive, while preferentially receives the first reception signal from the first positioning satellite, a second reception signal from a second positioning satellite based on a reception environment of the first reception signal from the first positioning satellite is poor.

6. The reception device according to claim 5,
wherein the first positioning satellite is a global positioning system (GPS) satellite, and
wherein the second positioning satellite is one of a global navigation satellite system (GLONASS) satellite, a BeiDou satellite, or a Galileo satellite.

7. The reception device according to claim 5,
wherein the A/D converter is further configured to operate based on the first clock signal at a time of the operation of the reception device in the first mode.

8. The reception device according to claim 7,
wherein the first positioning satellite is a Global Positioning System (GPS) satellite.

9. The reception device according to claim 5,
wherein the A/D converter is further configured to operate based on the second clock signal at a time of the operation of the reception device in the second mode.

10. The reception device according to claim 9,
wherein the first positioning satellite is a Global Positioning System (GPS) satellite, and
the second positioning satellite is a Global Navigation Satellite System (GLONASS) satellite.

* * * * *